United States Patent

Hsu et al.

Patent Number: 6,041,410
Date of Patent: *Mar. 21, 2000

[54] PERSONAL IDENTIFICATION FOB

[75] Inventors: Shi-Ping Hsu, Pasadena, Calif.; James M. Ling, Great Falls, Va.; Arthur F. Messenger; Bruce W. Evans, both of Redondo Beach, Calif.

[73] Assignee: TRW Inc., Redondo Beach, Calif.

[*] Notice: This patent is subject to a terminal disclaimer.

[21] Appl. No.: 08/995,267

[22] Filed: Dec. 22, 1997

[51] Int. Cl.[7] ................. H04L 9/10; H04L 9/30
[52] U.S. Cl. ............ 713/186; 713/202; 380/285
[58] Field of Search .................. 713/202, 186; 380/21, 23, 25, 283, 285; 709/229

[56] References Cited

U.S. PATENT DOCUMENTS

| | | | |
|---|---|---|---|
| 4,993,068 | 2/1991 | Piosenka et al. | 380/23 |
| 4,995,086 | 2/1991 | Lilley et al. | 382/4 |
| 5,124,920 | 6/1992 | Tamada et al. | 364/424.05 |
| 5,363,448 | 11/1994 | Koopman, Jr. et al. | 380/23 |
| 5,412,727 | 5/1995 | Drexler et al. | 380/24 |
| 5,519,260 | 5/1996 | Washington | 307/10.5 |
| 5,541,994 | 7/1996 | Tomko et al. | 380/30 |
| 5,659,367 | 8/1997 | Yuen | 348/465 |
| 5,661,451 | 8/1997 | Pollag | 340/426 |
| 5,686,765 | 11/1997 | Washington | 307/10.5 |
| 5,852,665 | 12/1998 | Gressel et al. | 380/30 |
| 5,878,142 | 3/1999 | Caputo et al. | 380/25 |

OTHER PUBLICATIONS

Schneier, B., "Applied Cryptography: Protocols, Algorithms, and Source Code in C," John Wiley & Sons, Oct. 18, 1995, pp. 37–39.

*Primary Examiner*—Tod R. Swann
*Assistant Examiner*—Justin T. Darrow
*Attorney, Agent, or Firm*—Michael S. Yatsko

[57] ABSTRACT

Apparatus, and a method for its use, for automatically verifying the identity of a person seeking access to a protected property, such as a car, room, building or automatic teller machine. The apparatus, which is disclosed in the form of a handheld fob (14), includes a sensor (16) for reading biometric data, such as a fingerprint image, from the person (12), and a correlator (28) for comparing the sensed data with a previously stored reference image (32) and for determining whether there is a match. If there is a match, the fob (14) initiates an exchange of signals with the "door" (10) that protects the property. Specifically, the fob (14) generates a numerical value, such as a cyclic redundancy code, from the stored reference image (32), encrypts the numerical value, and transmits it to the door (10) as confirmation of the person's identity. For further security, the person (12) registers this numerical value at each door (10) to which access is desired. Upon receipt of identity confirmation from the fob (14), the door (10) compares the received numerical value with the one stored during registration, before granting access.

6 Claims, 4 Drawing Sheets

PERSONAL IDENTIFICATION FOB

BACKGROUND OF THE INVENTION

The present invention relates generally to personal identification or verification systems and, more particularly, to systems that automatically verify a person's identity before granting access to something of value. Traditionally, keys and locks, or combination locks, have been used to limit access to property, on the theory that only persons with a right to access the property will have the required key or combination. This traditional approach is, of course, still widely used to limit access to a variety of enclosed spaces, including rooms, buildings, automobiles and safe deposit boxes in banks. In recent years, mechanical locks have been supplanted by electronic ones actuated by encoded plastic cards, as used, for example, for access to hotel room doors, or to bank automatic teller machines (ATMs). In the latter case, the user of the plastic card as a "key" to a bank account must also supply a personal identification number (PIN) before access is granted.

Many automobiles are protected both by locks and by intrusion alarms, which are typically activated and deactivated using a small radio or infrared transmitter carried by the car owner as a key-chain fob. Although this type of device is convenient, its loss by the owner may render the vehicle just as vulnerable to theft as if mechanical keys had been used for protection.

Today, a person still needs to carry a variety of keys for access to home, workplace and car, and an ever expanding stack of plastic cards for access to financial assets, such as bank accounts and store charge accounts. Today's busy person must memorize several passwords and PINs for use in conjunction with the plastic cards, and for use to access computer software that may or may not require an access card as well. Moreover, all of the foregoing devices for limiting access are subject to theft, duplication and misuse. Assets protected by mechanical keys are the most vulnerable, of course, but assets protected by combinations, passwords and PINs are also subject to illegal entry by unauthorized users who have stolen, deduced or guessed the appropriate combination, password or PIN.

Accordingly, there is a widely felt need for a more reliable technique for limiting access to personal property and other valuable assets. Ideally, the technique should positively verify the identity of the person seeking access, and should eliminate the need to carry multiple keys and scannable cards, and the need to memorize combinations, passwords and PINs. The present invention satisfies this need.

SUMMARY OF THE INVENTION

The present invention resides in apparatus, and a method for its use, for automatically verifying the identity of a person seeking access to a protected property. The protected property may take a variety of forms, such as a building, a room, an automobile or a financial account. For purposes of explanation, access to the protected property is said to be obtained through a "door." In many cases, if the property is an automobile, a room or a building, for example, it will in fact have a physical door through which access is obtained. Other types of protected property will not have a physical entry door, but may still be considered to have a "door" for purposes of the present invention. In accordance with an important aspect of the invention, a person may securely access a door that is located right next to the user or one that is thousands of miles away.

Briefly, and in general terms, the apparatus of the present invention comprises a sensor, for reading biometric data identifying a person seeking access to a protected property; storage means, for storing reference biometric data identifying a person authorized to have access to the protected property; a correlator, for comparing the stored reference biometric data with the biometric data of the person seeking access and determining whether they match; and means for securely communicating identity confirmation to a door that provides access to the protected property upon receipt of the identity confirmation. The apparatus may further comprise a user interface having a first switch to initiate operation of the apparatus in a verification mode, and a second switch, actuation of which places the apparatus in an enroll mode of operation, wherein biometric data from the sensor are stored in the storage means for subsequent retrieval in the verification mode of operation.

In the disclosed embodiments of the invention, the sensor, the storage means and the correlator are all contained in a portable device, which may be a fob carried by the person, or some other type of communication device remote from the protected property. In the disclosed embodiments, the means for securely communicating identity confirmation includes means for generating a numerical value from the stored reference biometric data; encryption logic, for encrypting the numerical value; and a communication interface for sending the encrypted numerical value to the door, together with identification data for the person. The door provides the desired access to the protected property upon confirming that the transmitted numerical value is the same as one previously provided by the person during a registration procedure.

The apparatus of the invention may further include a receiver, for receiving an encryption key generated by and transmitted from the door, and means for storing a private encryption key in the portable device. Further, the encryption logic in the device includes means for doubly encrypting the numerical value using the encryption key received from the door and the private encryption key.

The apparatus of the invention may also be defined as a portable fob that includes a sensor, for reading fingerprint data identifying a user seeking access to a protected property; a memory for storing a reference fingerprint image of the user during an enrollment procedure and for holding the reference image for future use; an image correlator, for comparing the stored reference image with a fingerprint image of the user seeking access, as obtained from the sensor, and for determining whether the two images match; and means for securely communicating identity confirmation to a door that provides access to the protected property upon receipt of the identity confirmation. More specifically, the means for securely communicating identity confirmation includes means for generating a numerical value from the stored reference fingerprint image; encryption logic, for encrypting the numerical value; and a transmitter for sending the encrypted numerical value to the door, together with user identification data. The door provides the desired access to the protected property upon confirming that the transmitted numerical value is the same as one previously provided by the user during a registration procedure.

In the personal identification fob as defined in the previous paragraph, the means for generating a numerical value includes means for generating a cyclic redundancy code from the stored reference fingerprint image. The fob further includes a receiver, for receiving an encryption key generated by and transmitted from the door; and means for storing a private encryption key in the fob. The encryption logic in the fob includes means for doubly encrypting the numerical value using the encryption key received from the door and the private encryption key.

In terms of a novel method, the invention comprises the steps of sensing biometric data of a user, through a sensor that is part of a personal identification device carried by the user; comparing the sensed biometric data with reference biometric data previously stored in the personal identification device; determining whether the sensed biometric data match the reference biometric data; if there is a match, securely communicating an identity confirmation to a door that controls access to the protected property; and upon confirmation of the identity of the user at the door, actuating a device that provides the desired access. The method further comprises the step of initiating normal operation of the personal identification device by means of a manual switch.

In one embodiment of the method, there are optional steps of receiving a "wake-up" message from the door on approaching it to seek access; and initiating normal operation of the personal identification device on receiving the "wake-up" message. The step of securely communicating includes generating a numerical value from the stored reference biometric data; encrypting the numerical value; transmitting the encrypted numerical value to the door; transmitting user identification data to the door; receiving and decrypting the encrypted numerical value at the door; comparing the decrypted numerical value with one previously stored at the door by the user during a registration process, to confirm the identity of the user; and if the identity of the user is confirmed, activating a desired function to provide access to the protected property.

More specifically, the step of securely communicating further comprises the steps of generating at the door a random pair of door public and private encryption keys; transmitting the door public key to the personal identification device; selecting for the personal identification device a pair of public and private encryption keys for all subsequent uses of the device; providing the personal identification device public key to the door as part of the door registration process; and storing the personal identification device private key secretly in the device. The encrypting step includes doubly encrypting the numerical value with the door public key and the personal identification device private key. The method further includes the step, performed at the door, of decrypting the doubly encrypted numerical value using the personal identification device public key and the door private key.

It will be appreciated from the foregoing that the present invention represents a significant advance in providing secure access to buildings, vehicles, computers, or any other protected property. More particularly, the invention allows multiple properties or assets to be accessed using a single security device, which reliably identifies its owner using biometric data, such as a fingerprint. Because identification is verified in a small portable device, communication with multiple "doors" to protected property can be limited to a simple identity confirmation message, appropriately encrypted to prevent eavesdropping or reverse engineering. Other aspects and advantages of the invention will become apparent from the following more detailed description, taken in conjunction with the accompanying drawings.

DESCRIPTION OF THE PREFERRED EMBODIMENTS

Figure 1:
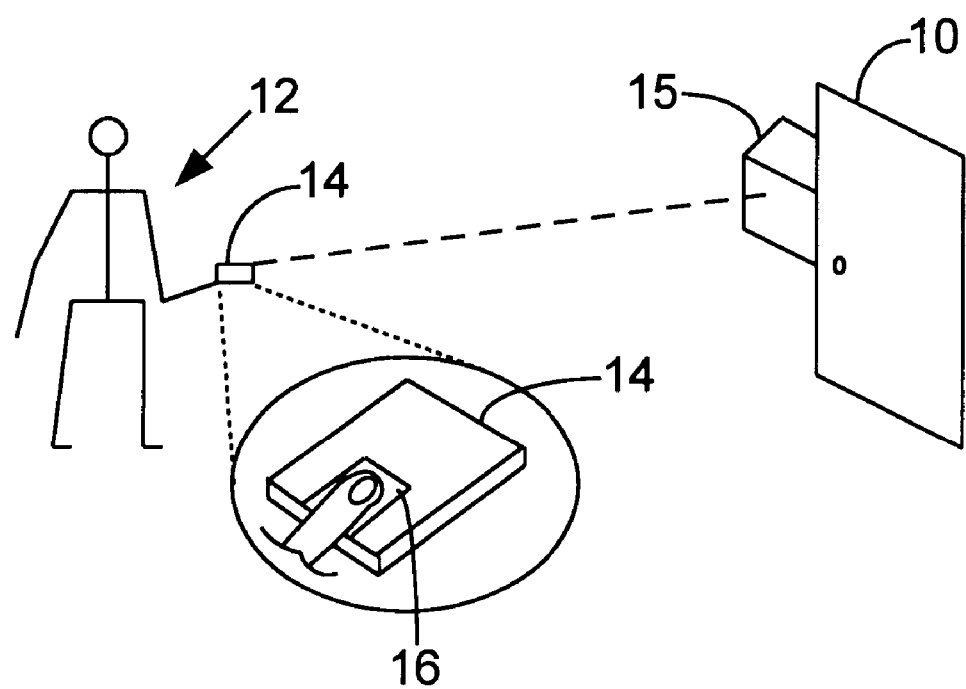
FIG. 1 is a diagram illustrating an application of the invention, wherein a portable device is used to open a door to a protected property located nearby.

As shown in the drawings for purposes of illustration, the present invention pertains to a system for automatic verification of the identity of a person seeking access to protected property. Traditionally, property has been protected by mechanical locks and keys, or by combination locks or electronic devices requiring the memorization of combinations, passwords and personal identification numbers (PINs).

In accordance with the present invention, the person seeking access to protected property carries a portable device that includes a sensor capable of obtaining selected biometric measurements associated with the person, and communicating with a related device located near the "door" of the protected property. Preferably, the portable device also includes identity verification means, which compares the biometric measurements obtained from the sensor with corresponding measurements stored in a reference set of biometric measurements that were obtained from the same person during an enrollment procedure performed earlier.

FIG. 1 shows diagrammatically how the invention is used to open a "door," indicated by reference numeral 10, to protected property. A person 12 seeking entry to the door 10 carries a small handheld device 14, which may take the form of a fob. The fob 14 communicates with a receiver 15 located near the door 10. In the presently preferred embodiment of the invention, the fob 14 or similar portable device includes a biometric sensor, which, in the presently preferred embodiment of the invention, is a fingerprint sensor 16. It will be understood, however, that the principles of the invention are also applicable to a device that employs other biometric properties to identify the user 12, such as print patterns from other parts of the anatomy, or iris patterns of the eye.

When the user 12 places a finger over the sensor 16 and actuates a switch, the person's fingerprint is scanned and is compared with a reference fingerprint image stored in the fob 14, which includes a fingerprint correlator for this purpose. If the comparison results in a match, the fob 14 transmits a confirming message to the door 10, which is opened to allow access by the user 12.

The nature of the confirming message sent to the door 10 is of considerable importance, because a simple "OK" or "open" signal in a standardized format would be easy to duplicate in a "cloning" process, and unauthorized access would be a relatively simple matter. The confirming message should ideally be in the same format for different access "doors," but should be encoded or encrypted in a way that prevents its duplication and prevents reverse engineering of the fob 14. Details of one technique for accomplishing these goals are provided below.

Figure 2:
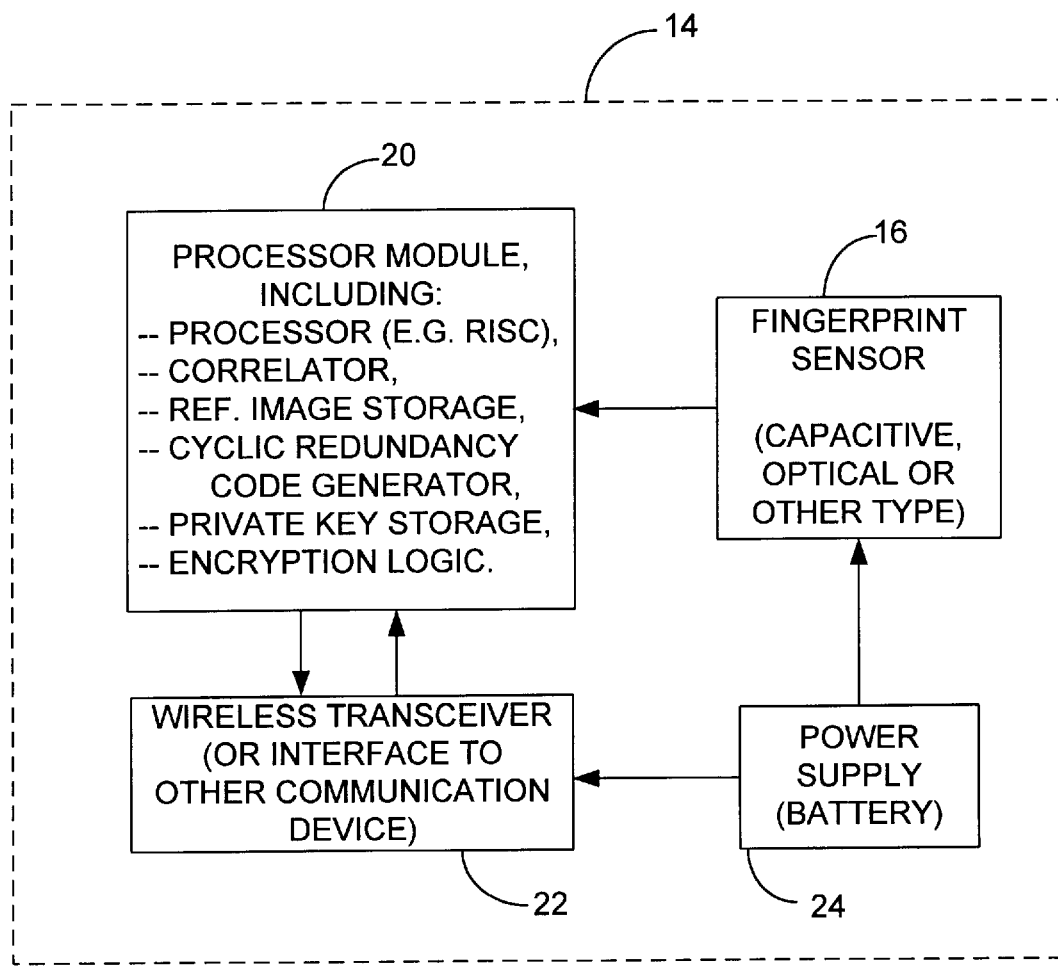
FIG. 2 is a block diagram depicting the principal components of the present invention.
Figure 3:
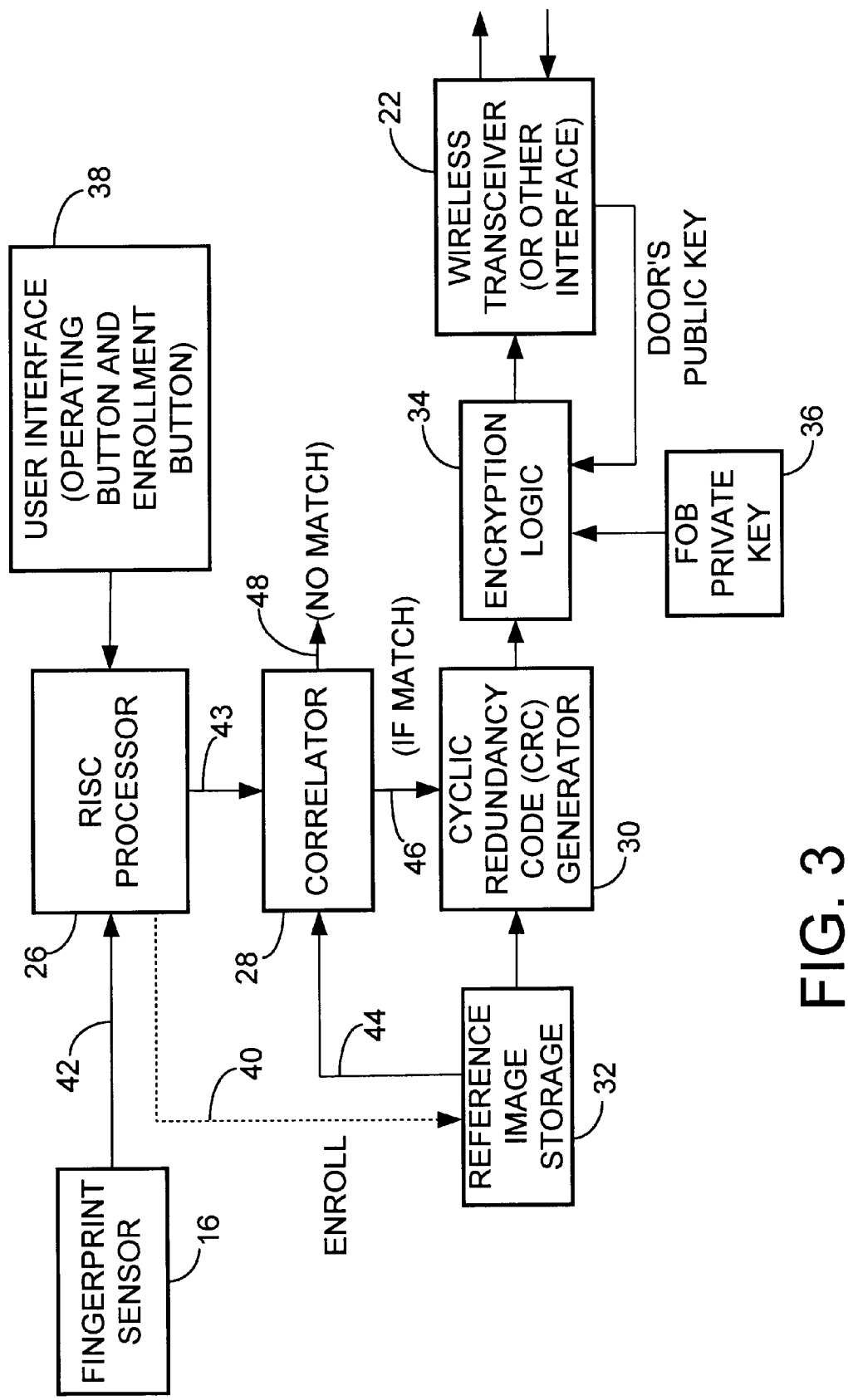
FIG. 3 is a more detailed block diagram showing the components of a processor module shown in FIG. 2.

FIG. 2 shows the principal components of the fob 14, including the fingerprint sensor 16, a processor module 20, a transceiver 22 and a battery power supply 24. The finger print sensor 16 may be of any available design, and may include a capacitive or optical sensor. The sensor 16 produces a binary or grayscale image of a portion of the user's fingerprint. For rapid processing, the entire image may not be used in the comparison process that follows, but what the sensor 16 provides is a detailed "map" of the fingerprint, including all of its ridges and valleys. The processor module 20 is shown in more detail in FIG. 3.

The processor module 20 includes a processor 26, which may be, for example a RISC (reduced instruction set computer) processor, a fingerprint matcher, which is a feature correlator 28 in the preferred embodiment of the invention, a cyclic redundancy code (CRC) generator 30, storage 32 for a reference fingerprint image, encryption logic 34 and storage 36 for a private encryption key. The fob 14 also includes a user interface 38 through which the user 12 initiates operation in various modes. Basically, the user interface 38 includes one main operating button, which may be incorporated into the fingerprint sensor 16, and at least one additional button to initiate operation in the enrollment mode. The principal function of the RISC processor 26 is to pre-process and enhance the fingerprint image provided by the sensor 16. Pre-processing includes "cleaning" the image, cropping the image to eliminate background effects, enhancing contrast in the image, and converting the image to a more manageable binary form. In the enrollment mode, the pre-processed image is stored in the reference image storage area 32, as indicated by the broken line 40. Enrollment is performed when the user first acquires the fob 14, and is normally not repeated unless the fob is lost or damaged. For additional security and convenience, the user may be asked to enroll two fingerprints, to allow for continued access if the user injures a finger, for example. In a verification mode of operation, the pre-processed fingerprint image is input to the correlator 28, as indicated by line 43, where it is compared with the reference image obtained from storage 32 over line 44. The correlator 28 uses an appropriate technique to compare the images, depending on the level of security desired. Because speed of operation is an important factor, a bit-by-bit comparison of the entire images is usually not performed. Rather, significant features of the reference image are identified and the same features are looked for in the newly scanned image. The techniques disclosed in U.S. Pat. No. 5,067,162 may, for example, be incorporated into the correlator 28 for some applications of the fob 14. Preferably, the fingerprint correlator 28 should follow the teachings of a co-pending patent application entitled "Fingerprint Feature Correlator," by inventors Bruce W. Evans et al., which is hereby incorporated by reference into this specification. As a result of the comparison of the images, the correlator 28 may generate a match signal on line 46, which activates the CRC generator 30. If a no-match signal is generated, as indicated on line 48, no further processing is performed. Optionally, the no-match signal on line 48 may be used to actuate an indicator on the user interface 38.

The cyclic redundancy code (CRC) generator 30, when actuated by a match signal on line 46, generates a relatively long (such as 128 bits) binary number derived from the reference image data. The CRC provides a single number that, for all practical purposes, uniquely identifies the stored reference fingerprint image. Even if two fingerprint images produced the same CRC, which is highly unlikely, the security of the system of the invention would not be compromised, as will shortly become clear.

The CRC itself is not stored in the fob 14, but is transmitted in encrypted form to the door receiver 15. Before using the fob 14 for access to a particular door 10 for the first time, the user 12 must first "register" at the door. The registration process is one in which an administrator of the door stores the user's name (or account number, or other identifying information), in association with a public encryption key to be used in the user's fob 14, and the user's CRC as derived from the user's reference fingerprint. If the door 10 provides access to a financial institution, for example, the user will register by bringing his or her fob 14 to the institution, and transmitting the fingerprint CRC from the fob to the door receiver 15. In the registration mode, the door receiver 15 will store the user's CRC in association with the user's name or other identifying information. As part of the registration process, the user 12 will normally be required to present some form of identification other than the fob 14, to prove to the institution that the user is, in fact, the one whose name or other identifying information is presented and will be stored in the door 10.

The registration process for access to more personal properties, such as one's automobile, is much simpler, but the user's name or other identifying information is still stored in the door in association with the CRC and the fob public encryption key. Even personal properties, such as automobiles, should have the capability to store several different sets of personal information, for use by multiple family members, for example. As will now be explained in more detail, in a subsequent use of the fob 14 for access to a door 10 at which the user has registered, the fob transmits a user name and the CRC corresponding to the stored reference image. Logic at the door 10 then compares the received CRC with the one that was stored for the named user during registration. If there is a match, the door is opened for the user.

Figure 4:
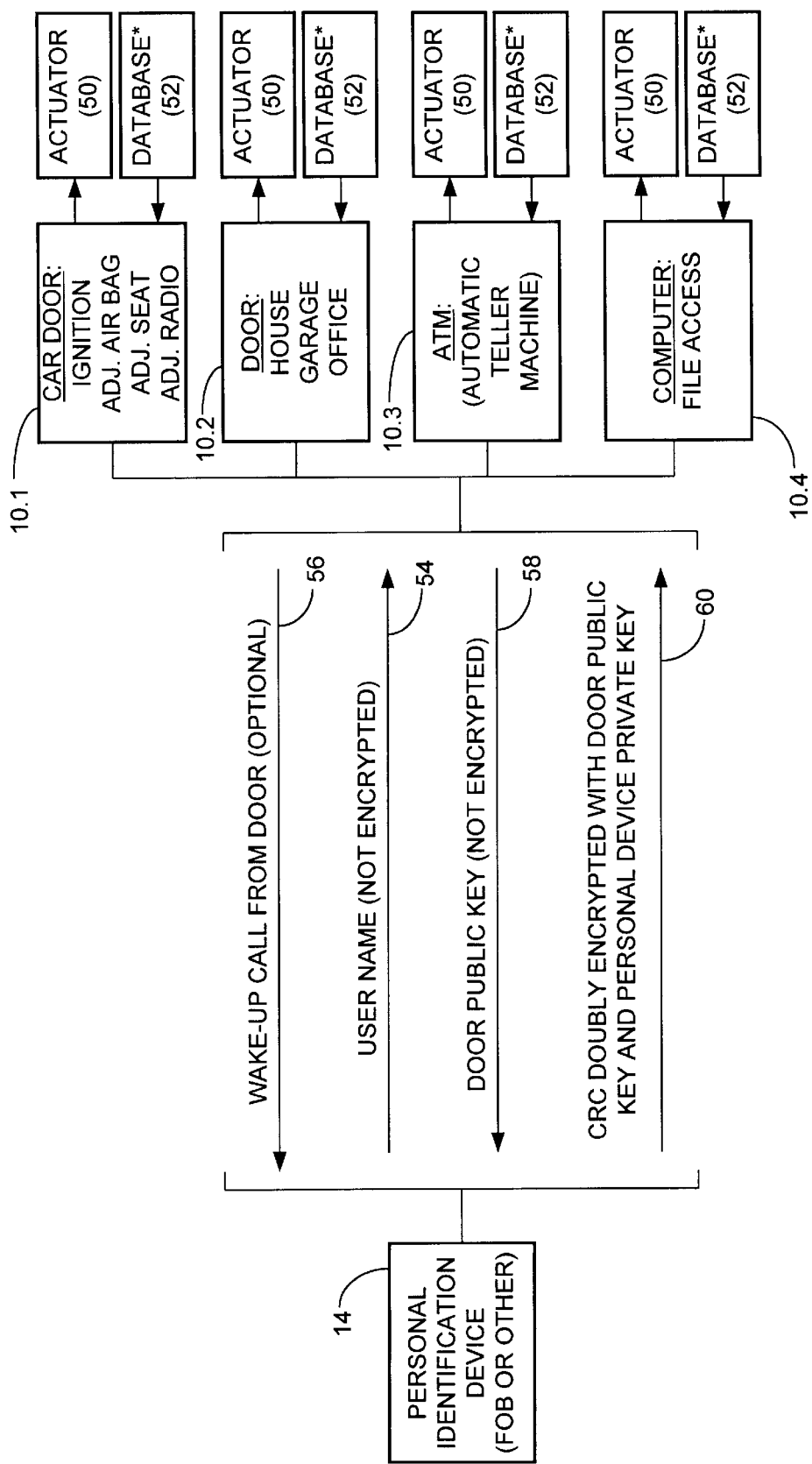
FIG. 4 is a block diagram showing a sequence of signals transmitted between the portable device and a door to protected property.

FIG. 4 shows the communications that pass between the fob 14 or other personal identification device and a door 10, four different forms of which are shown, including a car door 10.1, a building door 10.2, an automatic teller machine (ATM) 10.3, and a computer 10.4. Each door 10 has an actuator 50, to perform some desired operation, such as opening the door, and each door also has a database 52 in which is stored the user name, the user fob public encryption key and the user CRC, for each user registered to use the door.

When the user actuates the fob 14, the user name is transmitted to the door 10 in non-encrypted form, as indicated by line 54. Optionally, this step may be triggered automatically as the user approaches the door 10. As indicated by line 56, the door 10 may transmit a "wake-up" call that is received by an approaching fob 14, which then transmits the user name.

On receiving the user name, the door 10 generates a random pair of public and private encryption keys to be used in the ensuing exchange of messages. Since public key encryption is used in this illustrative embodiment of the invention, a few words of explanation are called for, but it will be understood that the principles of public key encryption are well understood in the field of secure communication.

In public key encryption, two separate encryption keys are used: a "public" key (potentially known to everyone and not kept secret), and a "private" key (known to only one party in a communication from one party to another). The pair of public-private keys has the property that, if either of them is used to encrypt a message, the other one of the pair will decrypt the message. For example, party A can send a secure message to party B by first encrypting with B's public key. Only B can decrypt the message, because only B has B's private key needed for decryption. Similarly, B could send an encrypted message to A using B's private key for encryption. A could decrypt the message with B's public key, but so could anyone else, because B's public key may be known to others. Therefore, the message transmitted using this "backward" form of public key encryption would not be secure.

The illustrative embodiment of the present invention uses a double encryption form of public key encryption. Both the fob 14 and the door 10 have a public-private key pair. As presently contemplated, the fob 14 of the invention will have a "fixed" public and private key pair, that is to say the public and private keys will not changed from one use of the fob to the next. The fob public key is registered with each door 10 and it would be impractical to change it for every use. The fob private key is stored (at 36, FIG. 3) in the fob 14, preferably in a form in which it cannot be discerned by inspection or reverse engineering. The key may, for example, be encoded into the silicon structure of the processor module 20 in such a way that it is practically indecipherable by any normal reverse engineering technique. Each door 10 generates a new public-private key pair on every new use of the door. Thus, these keys cannot be determined in advance of the actual message exchange with a fob 14.

Upon receipt of a user name from the fob 14, the door 10 to which access is sought generates a random pair of public-private keys, and transmits the public key to the fob without encryption, as indicated by line 58. Then, if the fob 14 has validated the user's identification by successfully matching the sensed fingerprint image with the reference image, the fob performs two levels of encryption on the CRC that is generated. First, the encryption logic 34 in the fob 14 encrypts the CRC using the door's public key. Then the resulting encrypted CRC is doubly encrypted using the fob's private key. The doubly encrypted CRC is transmitted to the door 10, where it is decrypted using the fob's public key and then using the door's private key to recover the CRC. The door 10 then compares this CRC with the CRC in its database 52 associated with the user name seeking access to the door. If there is a match, the door 10 signals its actuator 50 to open the door or to perform some other desired operation.

It will be appreciated from this description that the invention provides an extremely secure technique for accessing protected property. The fob 14 is designed such that is cannot initiate a door opening operation without first matching the fingerprint of the user with the stored reference image. Even if a fob thief successfully re-enrolls his own fingerprint into the fob, the CRCs stored in each of the doors where the rightful user is registered would prevent operation of the doors by the thief.

Someone attempting to fabricate a "cloned" fob would not have the fob private key, so the door would be unable to decrypt messages from the cloned fob. If someone were to eavesdrop on a fob transmission and try to emulate this message in a subsequent attempt to open the same door, this approach would be foiled by the door's use of a different set of keys for each transaction. Therefore, the fob's encrypted message to any door will be different on each occasion.

An additional level of security may be provided by storing the CRC at the door 10 in an internally encrypted form, to prevent theft of CRCs from doors.

It will be understood from the foregoing that the present invention represents a significant advance in the field of security devices for limiting access to property. In particular, the invention allows a person to obtain access to many different properties using a single handheld device that verifies its owner's identity very reliably, using unique biometric parameters, such as those found in a fingerprint. Moreover, the device of the invention is highly resistant to reverse engineering, "cloning" and other techniques for tampering to obtain access to the protected properties. It will also be appreciated that, although a specific embodiment of the invention has been described in detail for purposes of illustration, various modifications may be made without departing from the spirit and scope of the invention, which should not be limited except as by the appended claims.

What is claimed is:

1. A personal Identification fob for automatically verifying the identity of a user seeking to use the fob for access to a protected property, the fob comprising:

a sensor, for reading fingerprint data identifying a user seeking access to a protected property;

a memory for storing a reference fingerprint image of the user during an enrollment procedure and for holding the reference image for future use;

an image correlator, for comparing the stored reference image with a fingerprint image of the user seeking access, as obtained from the sensor, and for determining whether the two images match; and means for securely communicating identity confirmation to a door that provides access to the protected property upon receipt of the identity confirmation, wherein the means for securely communicating identity confirmation includes means for generating a numerical value from the stored reference fingerprint image, including means for generating a cyclic redundancy code from the stored reference fingerprint image, encryption logic, for encrypting the numerical value, and a transmitter for sending the encrypted numerical value to the door, together with user identification data, wherein the door provides the desired access to the protected property upon confirming that the transmitted numerical value is the same as one previously provided by the user during a registration procedure.

2. A personal identification fob as defined in claim 1, and further comprising:

a receiver, for receiving an encryption key generated by and transmitted from the door; and means for storing a private encryption key in the fob;

and wherein the encryption logic includes means for doubly encrypting the numerical value using the encryption key received from the door and the private encryption key.

3. A method for automatically verifying the identity of a user seeking access to a property protected by a door, the method comprising the steps of:

receiving from the door a "wake-up" message at a personal identification device carried by the user, upon approaching the door to seek access; and initiating normal operation of the personal identification device on receiving the "wake-up" message, sensing biometric data of a user, through a sensor that is part of the personal identification device;

comparing the sensed biometric data with reference biometric data previously stored in the personal identification device;

determining whether the sensed biometric data match the reference biometric data;

if there is a match, securely communicating an identity confirmation to the door; and upon confirmation of the identity of the user at the door, actuating a device that provides the desired access.

4. A method as defined in claim 2, wherein the step of securely communicating includes:

generating a numerical value from the stored reference biometric data;

encrypting the numerical value;

transmitting the encrypted numerical value to the door;

transmitting user identification data to the door;

receiving and decrypting the encrypted numerical value, at the door;

comparing the decrypted numerical value with one previously stored at the door by the user during a registration process, to confirm the identity of the user; and if the identity of the user is confirmed, activating a desired function to provide access to the protected property.

5. A method as defined in claim 4, wherein the step of securely communicating further comprises:

generating at the door a random pair of door public and private encryption keys;

transmitting the door public key to the personal identification device;

selecting for the personal identification device a pair of public and private encryption keys for all subsequent uses of the device;

providing the personal identification device public key to the door as part of the door registration process; and storing the personal identification device private key secretly in the device;

and wherein the encrypting step includes doubly encrypting the numerical value with the door public key and the personal identification device private key.

6. A method as defined in claim 5, wherein door performs the additional step of:

decrypting the doubly encrypted numerical value using the personal identification device public key and the door private key.

* * * * *